April 12, 1938.  R. W. COLLISON  2,113,573
CLOSURE OPERATOR AND LOCK
Filed Dec. 14, 1936    2 Sheets-Sheet 1
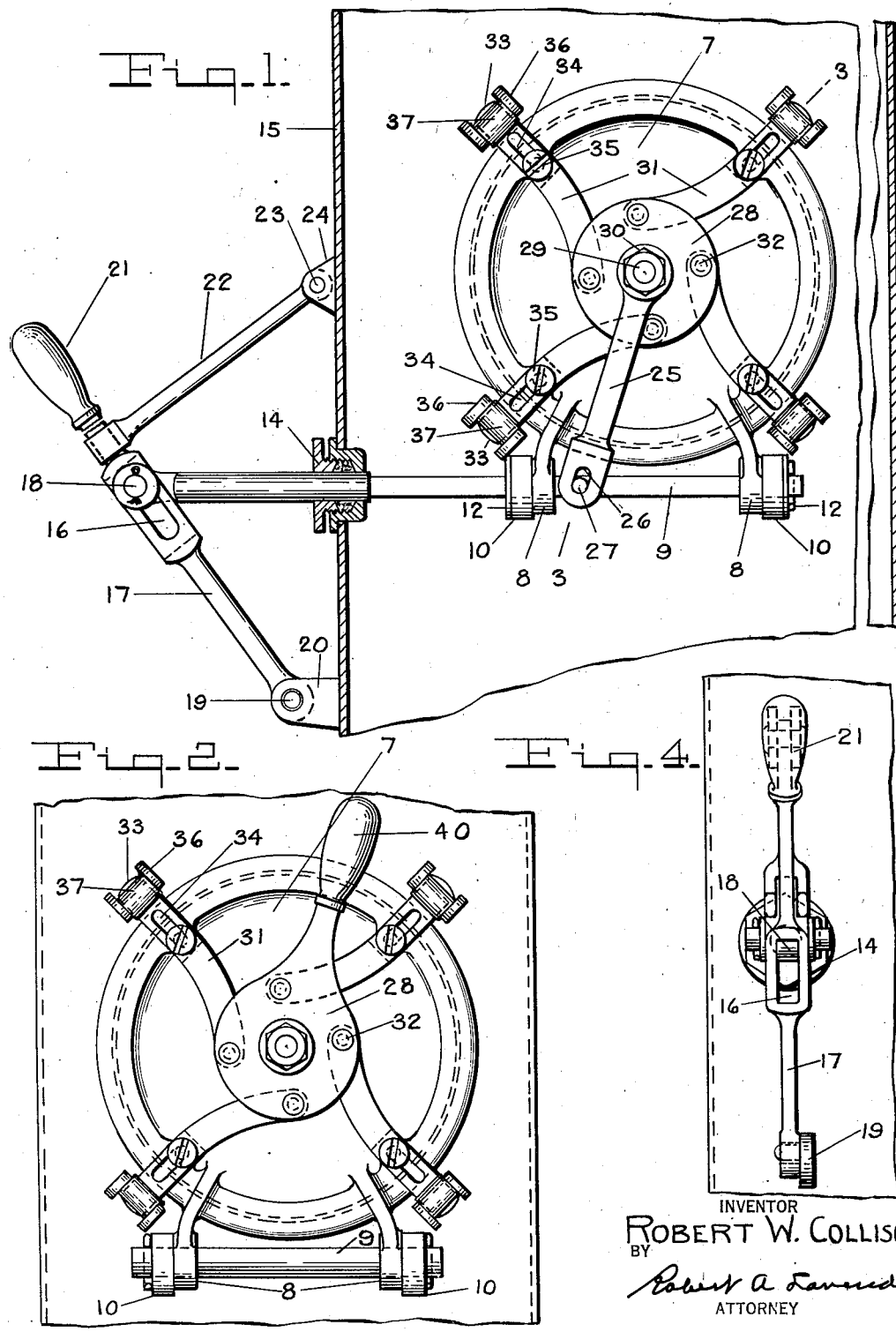
INVENTOR
ROBERT W. COLLISON
BY
ATTORNEY April 12, 1938.  R. W. COLLISON  2,113,573
CLOSURE OPERATOR AND LOCK
Filed Dec. 14, 1936   2 Sheets-Sheet 2
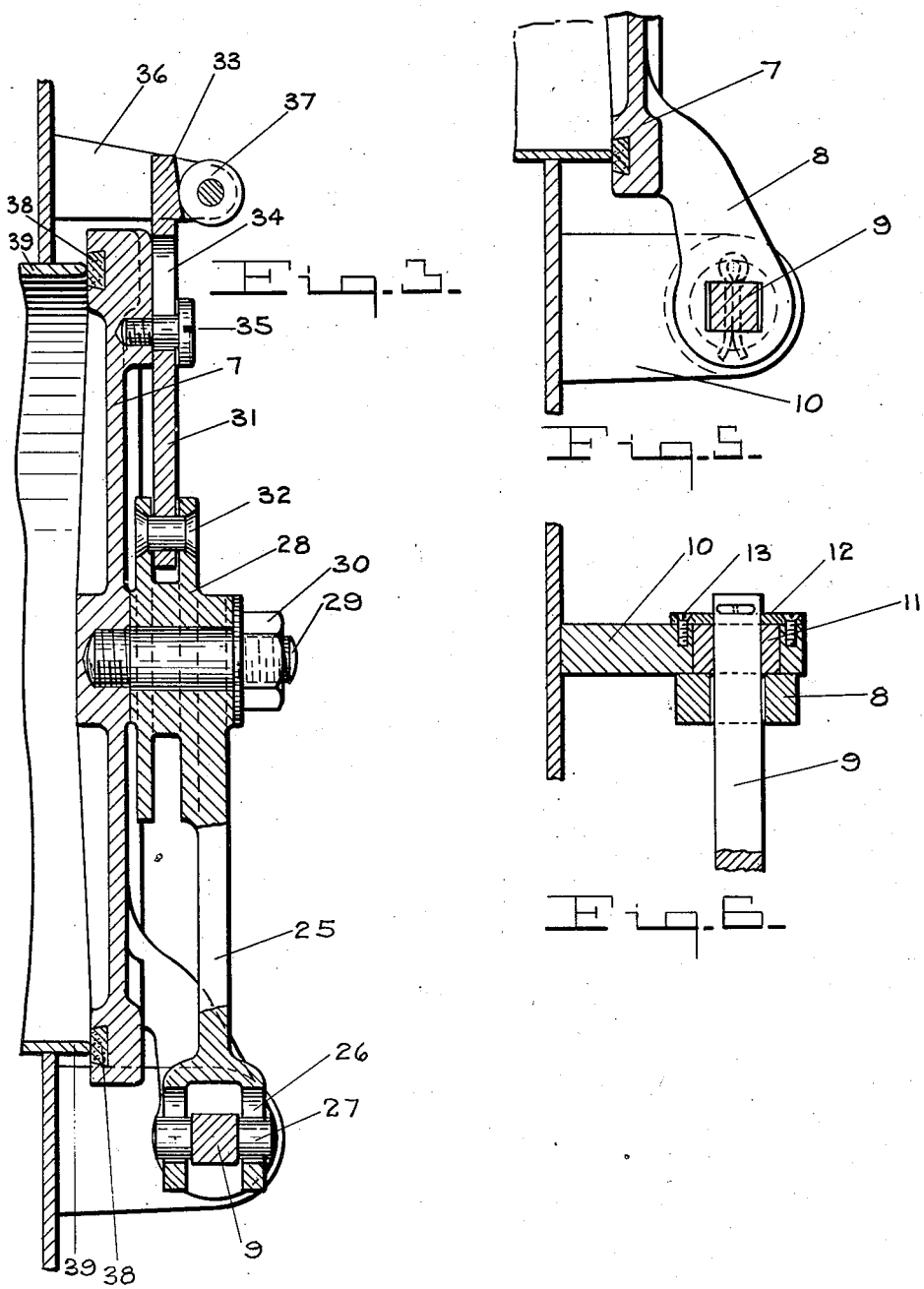
INVENTOR
ROBERT W. COLLISON
BY
*Robert A. Lavender*
ATTORNEY Patented Apr. 12, 1938

2,113,573

UNITED STATES PATENT OFFICE 2,113,573

CLOSURE OPERATOR AND LOCK

Robert W. Collison, Takoma Park, Md.

Application December 14, 1936, Serial No. 115,841

1 Claim. (Cl. 268—74)

(Granted under the act of March 3, 1883, as amended April 30, 1928; 370 O. G. 757)

My invention relates to a new and useful improvement in the quick closing and securing of openings in walls, bulkheads, floors, decks, ceilings and overheads of rooms or compartments locally, or from a distant location, so as to prevent the passage of fluids through the opening, by means of a quick closing hinged cover or closure member attached to the frame of the opening to be closed, and carrying a series of curved lugs or pawls which are caused to slide into brackets secured to the frame of the opening; said lugs or pawls being operated locally by a key lever or by a key lever fitted to a square shaft which is used to quickly and effectively close and secure the cover from a distance.

Other objects and advantages of the invention will be apparent during the course of the following description.

In the accompanying drawings, forming a part of this specification, and in which like numerals are employed to designate like parts throughout the same, Fig. 1 is an elevation of a hinged cover attached to the frame of an opening in accordance with my invention, and showing the curved lugs arranged to be operated by a lever from a distance;

Fig. 2 is a modification of Fig. 1, showing the curved lugs arranged to be operated locally by a single lever;

Fig. 3 is a vertical section of the form of the invention in Fig. 1;

Fig. 4 is a side view of the distant control lever of Fig. 1;

Fig. 5 is an end view of the hinge detail, and

Fig. 6 is a sectional side view of the hinge detail.

In the drawings, wherein for the purpose of illustration is shown a preferred embodiment of my invention, the number 7 represents a cover or closure member which is swung upon hinges 8, the latter being journalled on a square hinge pin 9, said hinge pin being secured in bearings 10 by means of journalled bushings 11 which are held in place by face plates 12 and screws 13.

The hinge pin 9 is rounded at the end which passes through a stuffing box 14 of a bulkhead or wall 15, and is loosely attached to slotted portion 16 of a lever 17 by means of a pin 18. The lever 17 is fulcrumed to the wall or bulkhead 15 by means of a breakable joint consisting of hinge 19 and hinge pad 20 which is secured to the bulkhead or wall. The free end of the lever 17 is used as a handle 21. The lever 17 is held in position which insures the cover 7 being tightly secured by means of a fork 22 which is pivoted to the wall or bulkhead 15 by a hinge 23 and hinge pad 24.

The hinge pin 9 operates a lever 25 which is slotted at 26 to receive a lug 27 of the hinge pin 9.

The lever 25 is attached to a grooved bolt disc 28 by a stud bolt 29 and a nut 30. Curved lugs or pawls 31 radiate from and are pivoted to the grooved bolt disc 28 at 32 and terminate in wedge shaped sections 33, guided by the slotted areas 34 and machine screws 35, which are secured into the cover 7. A series of brackets 36 supporting rollers 37 are secured upon the facing of the opening to be closed to correspond with the bolts 33. When the cover 7 is closed the bolts 33 register with the brackets 36 so that when the sections 33 are moved outward they pass into the brackets 36. As each section 33 is wedge shaped, its upper edge will act as a cam upon the roller 37 of the bracket 36 to thereby force the cover 7 inward with sufficient pressure to cause the elastic packing 38 of the cover 7 to be forced into a coaming 39 of the opening, making a perfectly fluid-tight joint and preventing any leakage around the cover.

In order to open the cover 7 (it being shown closed in Fig. 1), the fork 22 is lifted out from its secured position and the handle 21 is pushed in towards the bulkhead or wall 15. This causes the hinge pin 9 to move laterally and the end of the hinge pin to slide in the slotted portion 16 of the lever 17. This lateral motion of the hinge pin 9 by means of the lever 25 and the lug 27 causes the grooved bolt disc 28 to turn in a counter-clockwise direction. The revolving of the disc 28 causes the lugs or pawls 31 to withdraw their wedge shaped sections 33 from the brackets 26. The hinge pin 9 is so constructed that when it has traveled a sufficient distance to withdraw the bolts 33 from the brackets 36 the lever 17 will have been pushed in its full amount of travel, until it forms an angle with the hinge pin 9 of about ninety degrees. While in this position the hinge 19 is cast adrift from the pad 20 and the lever 17 is rotated in a clockwise direction. The rotation of the lever 17 turns the hinge pin 9 and with it the hinge 8, thus opening the cover 7.

In order to close and secure the cover 7 the reverse of the above is carried out; namely, the lever is turned in a counter-clockwise direction until the hinge 19 is in line with the pad 20. This movement imparted to the hinge pin 9 closes the cover 7. The hinge 19 is then engaged with the pad 20 and the lever 17 is pulled away from the bulkhead or wall 15. This imparts a lateral motion to the hinge pin 9 which in turn causes the disc 28 to rotate in a clockwise direction, causing the curved lugs or pawls 31 to shove home the wedge shaped sections 33 into the brackets 36.

Fig. 2 shows a modification of the method of closing in that the disc 28 has incorporated into it a handle 40 which is used to close and secure the cover 7 locally. In order to close and secure, the cover is closed. The handle 40 is then rotated in a clockwise direction. This causes the disc 28 to rotate and to impart motion to the curved lugs or pawls 31, which shoves the wedge shaped sections 33 into the brackets 36.

It is to be understood that the form of my invention, herewith shown and described, is to be taken as a preferred example of the same, and that various changes in the shape, size and arrangement of parts may be resorted to, without departing from the spirit of my invention or the scope of the subjoined claims.

The invention described herein may be manufactured by or for the Government of the United States of America for governmental purposes without the payment of any royalties thereon or therefor.

Having thus set forth and disclosed the nature of this invention, what is claimed is:

For use with a member having an opening to be closed and a closure member for the opening, the closure member being pivotally hinged to the member having the opening; a plurality of brackets for the closure member to be located about the opening in the member, a disc rotatably mounted on the closure member, a plurality of curved lugs, one end of each said curved lugs being pivotally secured to said disc, a pin and slot connection adjacent the other ends of said curved lugs to the closure member, wedge ends on the extremities of said lugs, said wedge ends being adapted to be projected beneath the bracket members to seal said closure member in said openings; remotely controllable means for operating the closure member from beyond a wall to closing and sealing position, said remotely controllable means including a hinge pin journalled through the wall and having an irregularly shaped end, the closure member having hinge plates through which said hinge pin may move in a transverse but not in a pivotable direction, a lever secured to said disc, a pin and slot connection between said lever and said hinge pin whereby transverse motion of said hinge pin operates said lever to actuate said disc and rotated motion of said hinge pin operates the closure member between open and closed position, and means for moving said hinge pin in transverse and pivotal directions, said means including a second lever, a pin and slot connection between said second lever and said hinge pin, a handle at one end of said second lever, a hinge joint formed at the other end of said second lever, a pad projecting from the wall adapted to cooperate with said hinge joint whereby said handle may be actuated toward said wall to move said hinge pin transversely to unseal the closure member and may then be rotated with said hinge joint free of said pad to open the closure member.

ROBERT W. COLLISON.